(Model.)
W. S. BRAMAN.
Crate.
No. 239,140.      Patented March 22, 1881.
Fig: 1.
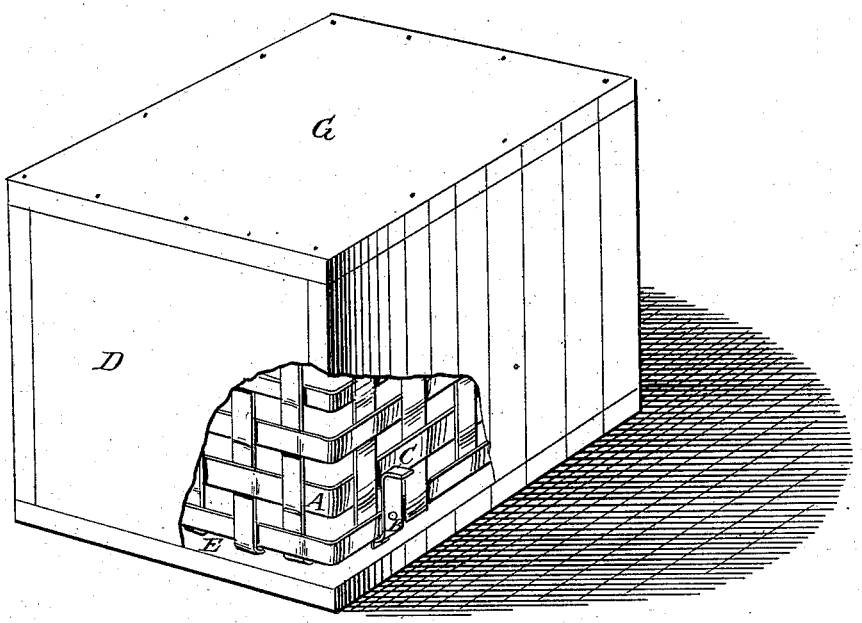
Fig: 2.
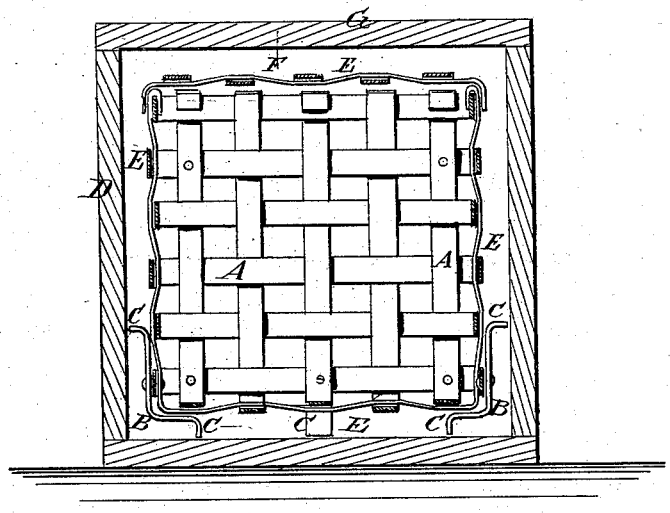
WITNESSES:
Chas. Nidg.
C. Sedgwick
INVENTOR:
W. S. Braman
BY
ATTORNEYS.

UNITED STATES PATENT OFFICE.

WILLIAM S. BRAMAN, OF KEY WEST, FLORIDA.

CRATE.

SPECIFICATION forming part of Letters Patent No. 239,140, dated March 22, 1881.

Application filed October 1, 1880. (Model.)

*To all whom it may concern:*

Be it known that I, WILLIAM S. BRAMAN, of Key West, in the county of Monroe and State of Florida, have invented a new and Improved Crate, of which the following is a specification.

The object of my invention is to provide a new and improved crate for the transportation of fish, meats, and other like perishable articles, so as to protect them from decomposition during transportation or storage.

The invention consists of a crate made of a net-work of galvanized iron, and provided with a series of knees or projections, which keep the sides of the crate from coming in contact with the sides, whereby a body of ice is secured to the outside of the crate, which intervenes between the sides and bottom of the inclosing-box.

In the accompanying drawings, Figure 1 is a perspective view of my improved crate, showing one corner of the box broken off. Fig. 2 is a cross-sectional elevation of the same.

Similar letters of reference indicate corresponding parts.

The crate A is made of galvanized-iron wire or bands in the ordinary manner, and is provided with a series of knees, B B, having projections C C, from one to two inches in length, at the ends. These knees are riveted to the sides of the crate or attached in some other suitable manner; but care should be taken to have the projections C C on all the sides of the crate except the top, which does not require them.

The articles having been placed in the crate, the latter is inserted in a correspondingly-shaped but somewhat larger chamber of the ice-machine, so as to be covered by water, which is then frozen in contact with and around the fish or other articles, as well as around the crate. The whole mass is then removed to the box, when it is ready for transportation.

Having thus described my invention, what I claim as new, and desire to secure by Letters Patent, is—

A crate consisting of galvanized metallic bands, forming body, knees, and projections C, to adapt it to be used in connection with an ice-machine and for subsequent transportation, as described.

WILLIAM SAMUEL BRAMAN.

Witnesses:
WM. B. CURRY,
GEORGE L. BARTLUM.